United States Patent
Okumura et al.

(10) Patent No.: US 11,299,295 B2
(45) Date of Patent: Apr. 12, 2022

(54) THRUSTER CONTROL DEVICE AND THRUSTER CONTROL METHOD

(71) Applicant: MITSUBISHI HEAVY INDUSTRIES, LTD., Tokyo (JP)

(72) Inventors: Yukihiro Okumura, Tokyo (JP); Masaaki Nagase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 580 days.

(21) Appl. No.: 16/223,593

(22) Filed: Dec. 18, 2018

(65) Prior Publication Data
US 2019/0263541 A1      Aug. 29, 2019

(30) Foreign Application Priority Data

Feb. 23, 2018 (JP) .............................. JP2018-031105

(51) Int. Cl.
| | |
|---|---|
| B64G 1/36 | (2006.01) |
| F02K 9/86 | (2006.01) |
| F02K 9/96 | (2006.01) |
| B64G 1/40 | (2006.01) |
| F02K 9/80 | (2006.01) |
| F02K 99/00 | (2009.01) |

(52) U.S. Cl.
CPC .............. *B64G 1/36* (2013.01); *B64G 1/403* (2013.01); *F02K 9/80* (2013.01); *F02K 9/86* (2013.01); *F02K 9/96* (2013.01); *F02K 99/00* (2013.01)

(58) Field of Classification Search
CPC ...... F03H 1/0062–0075; F03H 1/0018; G05D 7/0623
See application file for complete search history.

(56) References Cited

U.S. PATENT DOCUMENTS

| | | | |
|---|---|---|---|
| 4,955,558 | A | 9/1990 | Machell et al. |
| 9,242,745 | B2 | 1/2016 | Fujita et al. |
| 2014/0145036 | A1* | 5/2014 | Fujita ........................ F02K 9/86 |
| | | | 244/169 |
| 2016/0025765 | A1* | 1/2016 | Panther .................. G01D 21/00 |
| | | | 702/150 |

FOREIGN PATENT DOCUMENTS

| | | |
|---|---|---|
| JP | 2001-182719 | 7/2001 |
| JP | 2014-104894 | 6/2014 |

OTHER PUBLICATIONS

Notice of Reasons for Refusal dated Jul. 28, 2021 in Japanese Patent Application No. 2018-031105, with English-language translation.

\* cited by examiner

*Primary Examiner* — Arun Goyal
*Assistant Examiner* — William L Breazeal
(74) *Attorney, Agent, or Firm* — Wenderoth, Lind & Ponack, L.L.P.

(57) ABSTRACT

A thruster control device has an opening degree estimating section and an opening degree control section. The opening degree estimating section calculates an estimated opening degree of a valve showing a rate at which the valve is opened, based on a balance of an acting force applied to a valve element of the valve to adjust a quantity of combustion gas to be ejected from a thruster and a fluid force applied to the valve element by the ejected combustion gas. The opening degree control section determines a target opening degree based on the estimated opening degree to control the opening degree of the valve.

10 Claims, 12 Drawing Sheets

46:ESTIMATION DATA

| FLUID FORCE | OPENING DEGREE |
|---|---|
|  |  |
|  |  |

THRUSTER CONTROL DEVICE AND THRUSTER CONTROL METHOD

TECHNICAL FIELD

The present invention relates to a thruster control device and a thruster control method.

BACKGROUND ART

A technique is known of using side thrusters to control the trajectory and attitude of a flying object which flies in atmosphere or in space.

Patent Literature 1 discloses a technique of controlling a pintle valve provided in each of a plurality of side thrusters based on the position of each side thruster, to control a pressure in a combustion chamber. Also, Patent Literature 1 discloses that the control is carried out based on an acceleration sensed by an acceleration sensor of a fuselage.

Patent Literature 2 discloses a technique of measuring hydraulic pressure by detecting a current used to move a valve element in a spool valve used for construction equipment such as a hydraulic excavator. A quantity of oil to be injected when a spool valve is opened is determined based on the measured hydraulic pressure.

CITATION LIST

[Patent Literature 1] JP 2014-104894A
[Patent Literature 2] JP 2001-182719A

SUMMARY OF THE INVENTION

Upon driving a thruster, each of valves provided for the thruster becomes hot so as to transform. To control the thrust of the thruster precisely, the opening degree of each valve must be known. However, it is difficult to know the opening degree of valve while the thruster is driven, because of the transformation of the valve. For this reason, to determine the opening degree in consideration of the transformation, the influence of transformation due to heat is acquired previously through a combustion examination and a correction is carried out in common to all the valves. However, because the combustion examination and the actual flight of a flying object are different in the combustion time and the environment, an error is generated in the opening degree so as to increase the difficulty of the actual control of the trajectory and attitude of the flying object.

In consideration of the above-mentioned situation, the present invention has as an object, to control the thrust of a thruster precisely while the thruster is driven.

Other objects could be understood from the following description of embodiments.

To achieve the above object, the thruster control device has an opening degree estimating section and an opening degree control section. The opening degree estimating section is configured to calculate an estimated opening degree of a valve showing a rate at which the valve is opened, based on a balance of an acting force applied to a valve element of the valve to adjust a quantity of combustion gas to be ejected from a thruster and a fluid force applied to the valve element by the ejected combustion gas. The opening degree control section is configured to determine a target opening degree based on the estimated opening degree to control the opening degree of the valve.

The opening degree estimating section may calculate the fluid force based on an acceleration of the valve element and an acting force. In this case, the opening degree estimating section calculates the estimated opening degree based on the fluid force.

The opening degree estimating section may hold opening degree data showing the opening degree of the valve to the fluid force applied to the valve element by the ejected combustion gas. In this case, the opening degree estimating section calculates acceleration force giving the valve the acceleration based on the acceleration. Also, the opening degree estimating section calculates the fluid force by subtracting the acceleration force from the acting force. The opening degree estimating section calculates the estimated opening degree from the fluid force based on the opening degree data.

The thruster control device may further include a valve element control section. The valve element control section includes a driving section and a detecting section. The driving section may apply the acting force to the valve element to control the opening and closing of the valve. The detecting section may detect a velocity of the valve element. In this case, the opening degree estimating section calculates the acceleration based on the velocity. The driving section controls the opening and closing of the valve based on the target opening degree.

The thruster control device may include a plurality of valve element control sections. The opening degree estimating section may calculate the estimated opening degree to each of the plurality of valve element control sections. The opening degree control section may determine the target opening degree to each of the plurality of valve element control sections.

The thruster control device may include a combustion chamber and a pressure sensing section. The combustion chamber may store the combustion gas ejected from the thruster. The pressure sensing section may sense a pressure in the combustion chamber. The opening degree control section may determine the target opening degree to each of the plurality of valve element control sections based on the sensed pressure and the estimated opening degree to each valve element control section.

The opening degree control section may hold a previous target opening degree of the valve set by the acting force of the driving section of each valve element control section. Also, the opening degree control section may subtract the target pressure from the sensed pressure to calculate a pressure difference. The opening degree control section subtracts the previous target opening degree from the estimated opening degree to calculate the opening degree difference to each valve element control section. The opening degree control section may determine the target opening degree to each valve element control section based on the pressure difference and a rate of the opening degree difference of each valve element control section to a total amount of the opening degree differences of the plurality of valve element control sections.

The opening degree control section may calculate the target opening degree based on a product of the pressure difference and the rate of the opening degree difference of each valve element control section to the total of opening degree differences and the previous target opening degree.

The driving section may have a motor to generate the acting force by a current flowing. The opening degree estimating section calculates the acting force based on a value of the current.

The estimated opening degree may be defined based on an estimated position of the valve element. The control opening degree may be defined based on a destination position of the valve element.

A thruster control method includes: calculating an estimated opening degree of a valve showing a rate at which the valve is opened, based on a balance of an acting force to applied to a valve element of the valve to adjust a quantity of combustion gas to be ejected from a thruster and a fluid force applied to the valve element by the ejected combustion gas; and determining a target opening degree based on the estimated opening degree to control the opening degree of the valve.

According to the present invention, the thrust of the thruster can be precisely controlled.

DESCRIPTION OF THE EMBODIMENTS

First Embodiment

Figure 1:
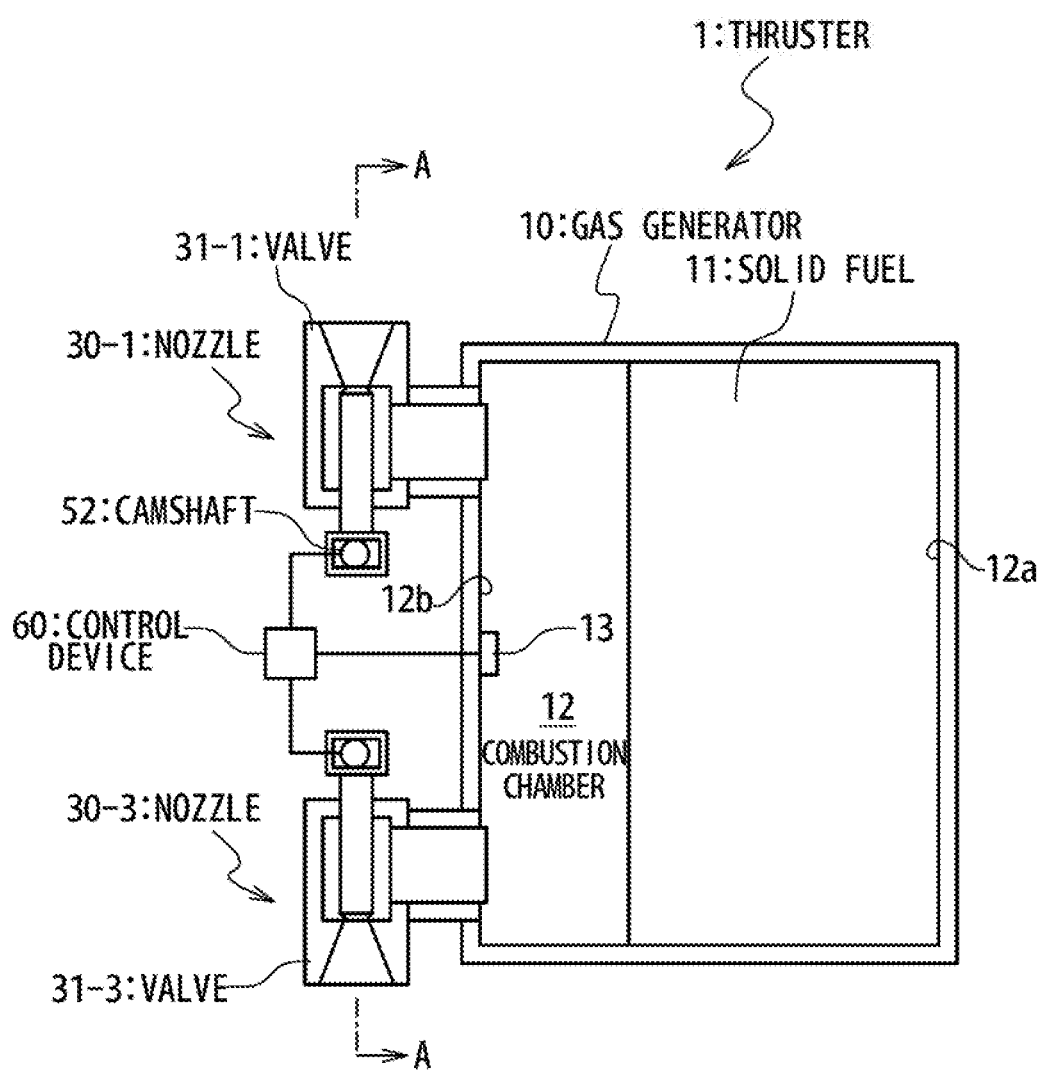
FIG. 1 is a schematic diagram of a thruster with a control device according to an embodiment.
Figure 2:
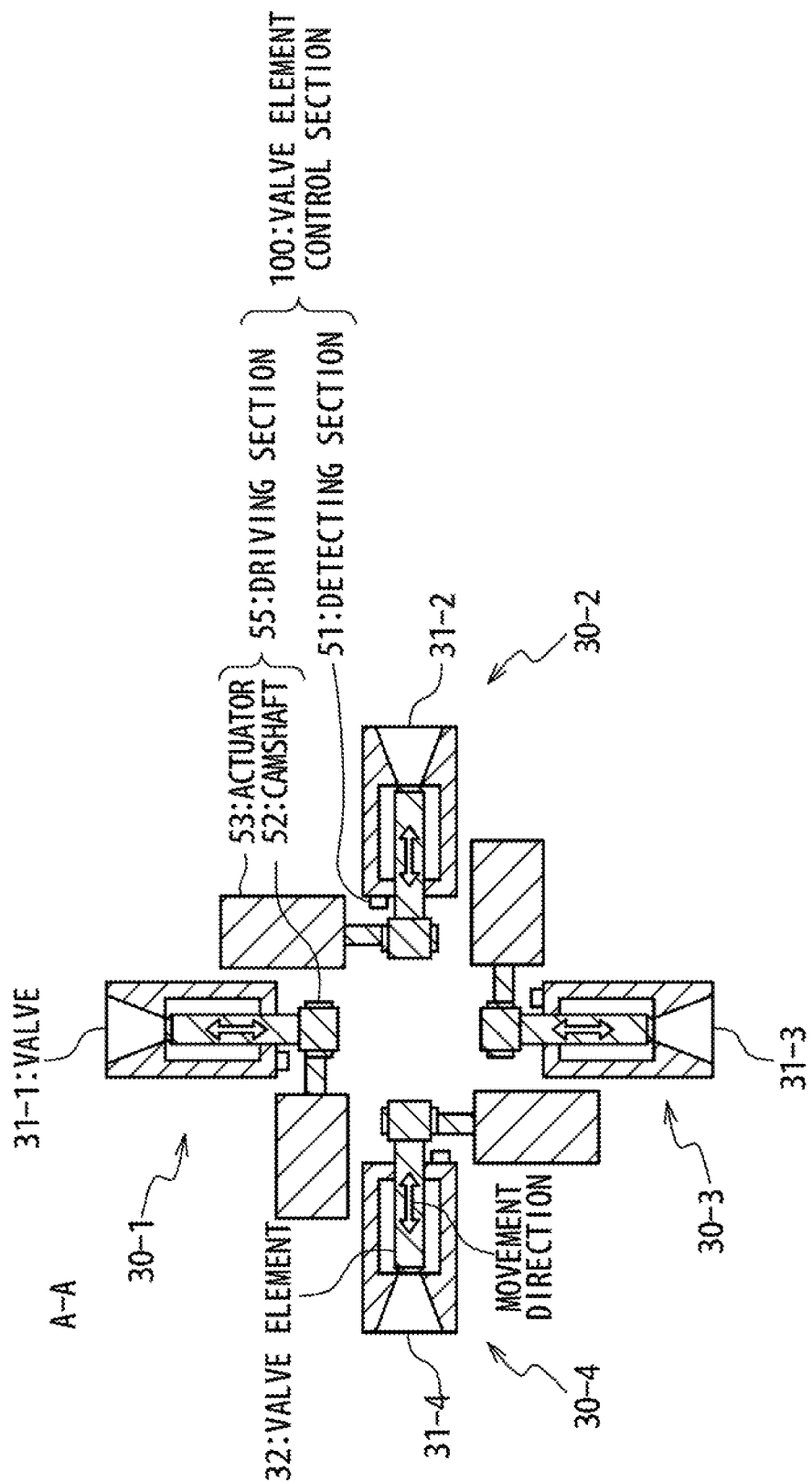
FIG. 2 is a cross-sectional view of the thruster along an A-A plane in FIG. 1.

A thruster 1 according to a first embodiment has a gas generator 10, a plurality of nozzles 30 (30-1, 30-2, 30-3, 30-4), and a control device 60, as shown in FIG. 1 and FIG. 2. A combustion gas is filled in the gas generator 10 and is supplied to the nozzles 30. The control device 60 controls a quantity of combustion gas to be supplied to the nozzles 30.

As a result, a trajectory and an attitude and so on of a flying object with the thruster are controlled.

A combustion chamber 12 and a solid fuel 11 are provided inside the gas generator 10. When the trajectory and attitude and so on of the flying object should be controlled, the solid fuel 11 is combusted to generate the combustion gas. Therefore, the combustion chamber 12 is filled with the combustion gas, which is supplied from the combustion chamber 12 to the nozzles 30 through ventilation ports provided on a wall 12b.

Also, a pressure sensing section 13 is provided inside the gas generator 10 to sense a pressure in the combustion chamber 12. The sensed pressure is notified to the control device 60 and is used to control the quantity of combustion gas ejected from the nozzles 30.

The combustion chamber 12 has the wall 12b having the ventilation ports to supply the combustion gas to the nozzles 30 and a wall 12a opposing to the wall 12b. For example, the combustion chamber 12 is a columnar space having the wall 12a as a bottom.

The solid fuel 11 is arranged in the combustion chamber 12 and is in contact with the wall 12a of the combustion chamber 12. Also, a space is provided between the solid fuel 11 and the wall 12b of the combustion chamber 12. When the trajectory and attitude and so on of the flying object should be controlled, the end surface the solid fuel 11 on the side of the nozzles 30 is ignited. In other words, the combustion of the solid fuel 11 proceeds for the wall 12a from the end surface of the solid fuel on the side of the nozzles 30.

The pressure sensing section 13 is provided on the wall 12b of the combustion chamber 12. Therefore, regardless of the position of combustion surface of the solid fuel 11, the pressure in the combustion chamber 12 can be sensed.

As shown in FIG. 2, each of the nozzles 30 has a valve 31 (31-1, 31-2, 31-3, 31-4) and a valve element control section 100. The combustion gas ejected from the combustion chamber 12 is supplied to the valves 31. The valve element control section 100 controls the open/close state of each of the valves 31. The quantity of combustion gas ejected from the nozzle 30 is controlled by opening and closing the valve 31.

The valve element control section 100 has a driving section 55 and a detecting section 51. The driving section 55 drives the position of a valve element 32 of the valve 31 to control the opening and closing of the valve 31. The detecting section 51 detects a velocity of valve element 32.

The driving section 55 has an actuator 53 and a camshaft 52. The actuator 53 is connected with the camshaft 52 to control the rotation of the camshaft 52 in response to control data 305 from the control device 60. By rotating the camshaft 52, the valve element 32 moves to the longitudinal direction (the direction shown in FIG. 2) to open or close the valve 31. The valve 31 opens so that the combustion gas supplied from the combustion chamber 12 is ejected from the nozzle 30.

The actuator 53 has a motor. A driving force 42 of the actuator 53 is generated by supplying a current to the motor, to rotate the camshaft 52. The valve element 32 moves in response to the driving force 42.

Figure 3:
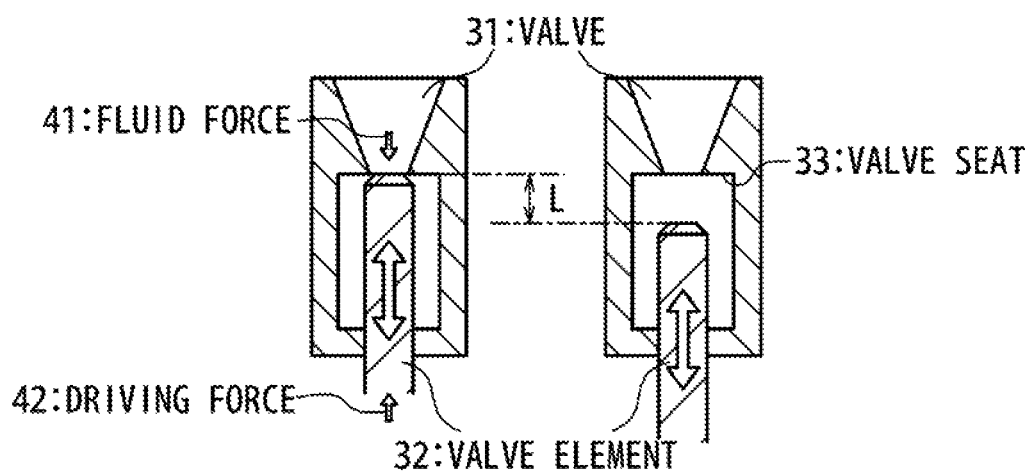
FIG. 3 is an enlarged view of a valve shown in FIG. 2.

The valve 31 is provided in an ejection hole of the nozzle 30 to adjust the quantity of combustion gas ejected from the nozzle 30. For example, the valve 31 may be a pintle valve. As shown in FIG. 3, the valve 31 has a valve seat 33 and the valve element 32 provided to be movable to the valve seat 33. When the valve element 32 abuts the valve seat 33, the valve 31 is closed so that the combustion gas is not ejected from the nozzle 30. When the valve element 32 leaves the valve seat 33, the valve 31 is opened so that the combustion gas is ejected from the nozzle 30. The quantity of combustion gas to be ejected increases as a distance L from the end of the valve element 32 to the valve seat 33 becomes large. In other words, the opening degree of the valve 31 is larger when the distance L is larger. Here, the opening degree means a rate at which the valve 31 is opened. In other words, when the valve 31 is closed, the opening degree is 0.

Figure 4:
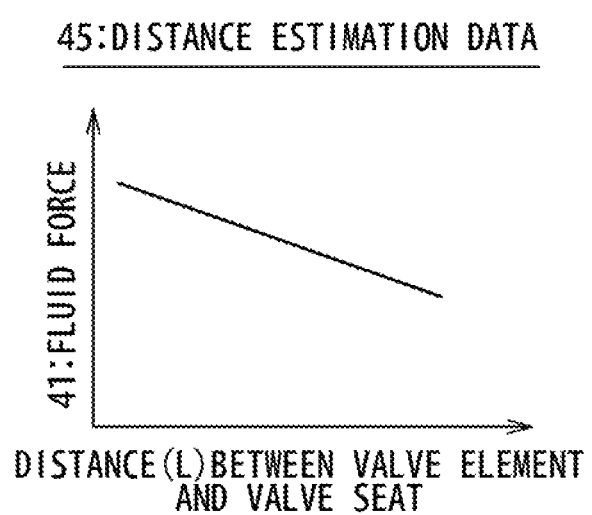
FIG. 4 is a graph showing a relation of a fluid force applied to a valve element shown in FIG. 2 and a distance between the valve element and a valve seat.

When the combustion gas is ejected from the nozzle 30, a fluid force 41 is applied to the valve element 32 by the combustion gas to a direction to increase the opening degree of the valve 31. Also, the driving force 42 is applied by the actuator 53 to a direction opposite to the direction of the fluid force. For these reasons, the valve element 32 changes its position according to a balance of the fluid force 41 and the driving force 42. The fluid force 41 applied to the valve element 32 changes according to the distance L, as shown in FIG. 4. Specifically, as the distance L becomes large, the fluid force 41 becomes small. For this reason, the distance L can be estimated based on the fluid force 41 by using distance estimation data 45 showing a relation of the distance L and the fluid force 41.

Here, the distance estimation data 45 may be calculated from the shape of the valve 31 in design. Also, an optimal value may be determined by using a simulation.

Figure 5:
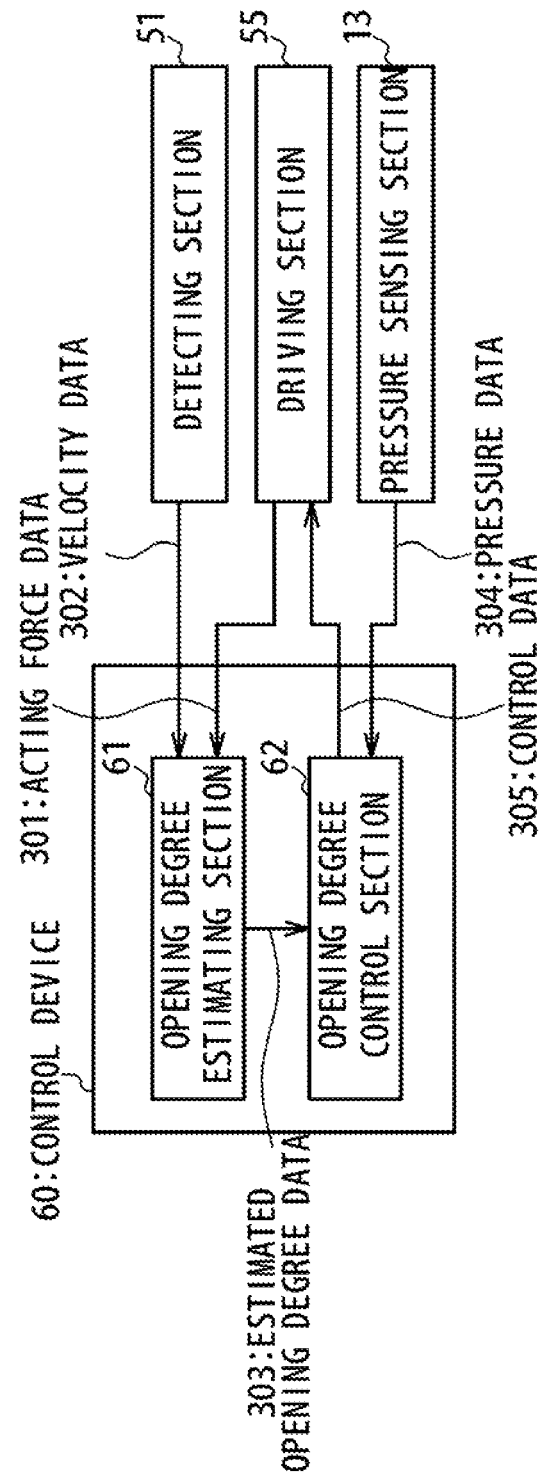
FIG. 5 is a block diagram showing a control device shown in FIG. 1.

As shown in FIG. 5, the control device 60 has an opening degree estimating section 61 having a function of estimating the opening degree of the valve 31, and an opening degree control section 62 having a function of controlling the opening degree of the valve 31.

The opening degree estimating section 61 receives velocity data 302 containing data showing the velocity of the valve element 32, from the detecting section 51. The opening degree estimating section 61 calculates an acceleration of the valve element 32 from a change of the received velocity data. The opening degree estimating section 61 calculates an acceleration force applied to the valve element 32 based on the calculated acceleration. Here, the acceleration force means a force that can give the calculated acceleration to the valve element 32. Also, the opening degree estimating section 61 receives acting force data 301 containing data showing the driving force 42 generated by the actuator 53, from the driving section 55. Here, the valve element 32 moves to a position at which the fluid force 41 and the driving force 42 are balanced. Therefore, a resultant force obtained by adding the acceleration force and the fluid force 41 applied to the valve element 32 becomes equal to the driving force 42. Therefore, the opening degree estimating section 61 can calculate the fluid force 41 by subtracting the acceleration force of the valve element 32 from the driving force 42. As shown in FIG. 4, the opening degree estimating section 61 estimates the distance L from the fluid force 41 by using the distance estimation data 45 showing the relation of the distance L and the fluid force 41. Here, because the valve 31 is transformed while the thruster 1 is driven, the estimated distance L is different from an actual distance from the valve seat 33 to the end of the valve element 32 and is only an index showing the opening degree of the valve 31. For this reason, the opening degree estimating section 61 estimates the distance L from the fluid force 41 to estimate the opening degree of the valve 31 as an estimated opening degree. The opening degree estimating section 61 calculates the estimated opening degree to each of the valves 31 (31-1, 31-2, 31-3, and 31-4), and generates estimated opening degree data 303 containing data showing the estimated opening degree of each valve 31. As described above, the estimated opening degree is calculated based on the balance of the driving force 42 applied to the valve element and the fluid force 41 applied to the valve element by the combustion gas.

The opening degree control section 62 extracts the estimated opening degree of the valve 31 from the estimated opening degree data 303. The opening degree control section 62 subtracts from the extracted estimated opening degree, a target opening degree of the valve 31 which has been set in the driving section 55, to calculate an error opening degree (or an opening degree difference). The target opening degree of the control data 305 means a setting opening degree of the valve 31 to be set currently in the driving section 55. For example, the target opening degree may be the distance L instructed to the driving section 55. The opening degree difference shows a difference between the target opening degree of the valve 31 set to the driving section 55 and an estimation of an actual opening degree of the valve 31, and the difference is caused due to the transformation of the valve 31. Also, the opening degree difference is calculated for every valve 31.

Also, the opening degree control section 62 receives pressure data 304 containing data showing the pressure in the combustion chamber 12, from the pressure sensing section 13. The opening degree control section 62 subtracts a target pressure from the actual pressure of the received pressure data to calculate a pressure difference. Here, the opening degree control section 62 controls the opening degree of the valve 31 based on the difference of the pressure in the combustion chamber 12. In other words, the pressure difference indicates a difference between the target pressure and the actual pressure.

Also, the pressure difference is related to a total opening degree in all of the plurality of valves 31. The plurality of valves 31 are connected with the combustion chamber 12 and the combustion gas in the combustion chamber 12 is ejected when the valves 31 are opened. Therefore, the pressure in the combustion chamber 12 changes depending on the opening degree of each valve 31. In other words, the pressure difference can be show a difference between the quantity of combustion gas to be ejected and the quantity of combustion gas ejected actually.

In other words, the opening degree control section 62 acquires an opening degree difference of each valve 31 and the pressure difference. The opening degree control section 62 calculates a correction opening degree of each valve 31 to the transformation of the valve 31 based on the acquired opening degree differences and the pressure difference. Specifically, the opening degree control section 62 calculates a rate of the opening degree difference of each valve 31 to a total of opening degree differences of the plurality of valves 31. The opening degree control section 62 multiplies the pressure difference by the calculated rate to calculate the correction opening degree to each valve 31.

Although the correction opening degree to each valve 31 can be calculated, the opening degree difference is easy to undergo influence of noise caused in the detecting section 51 and the driving section 55. On the other hand, although the pressure difference can show the total of opening degree differences of all the valves 31, the correction opening degree to each valve 31 cannot be calculated. Therefore, the rate of the opening degree difference of each valve 31 to the total of opening degree differences is used to reduce the influence of noise caused in the detecting section 51 and the driving section 55. As a result, the rate corresponds to the transformation of each valve 31.

Figure 6:
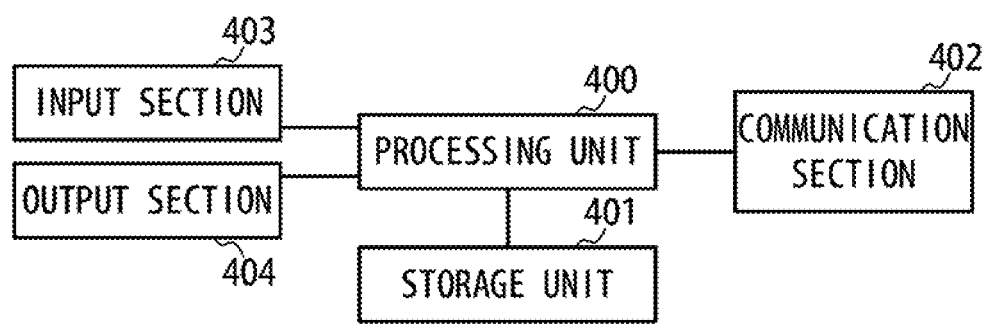
FIG. 6 is a diagram showing an example of hardware configuration of the control device shown in FIG. 1.

The control device 60 containing the opening degree estimating section 61 and the opening degree control section 62 has a processing unit 400, a storage unit 401 and a communication section 402, as shown in FIG. 6. The processing unit 400 carries out processing of controlling the thruster 1. For example, the processing unit 400 carries out the processing executed by the opening degree estimating section 61 and the opening degree control section 62, which are shown in FIG. 5. The storage unit 401 is used when the opening degree estimating section 61 and the opening degree control section 62 store data. For example, the storage unit 401 stores the distance estimation data 45 shown in FIG. 4. The communication section 402 is used for transmission and reception of data among the detecting section 51, the driving section 55 and the pressure sensing section 13. Here, the processing unit 400 may use a central processing unit (CPU) that carries out the processing of the opening degree estimating section 61 and the opening degree control section 62. Also, an exclusive-use processing circuit may be used for each of the opening degree estimating section 61 and the opening degree control section 62. Also, the control device 60 may have an input section 403 and an output section 404 to input and output data. A mouse, a keyboard and so on are exemplified as the input section 403. A display, a speaker and so on are exemplified as the output section 404.

(Control Method)

Figure 7:
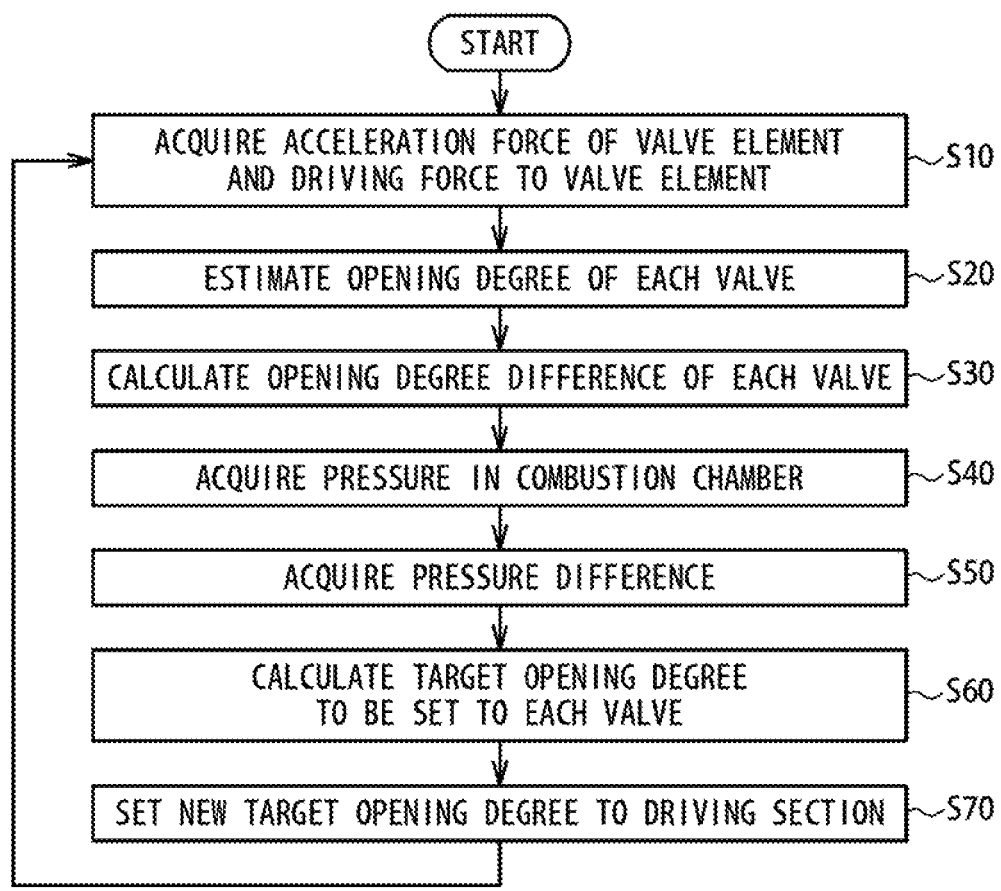
FIG. 7 is a flow chart of processing of the control device according to the embodiment.

A method of controlling the opening degrees of the valves 31 of the thruster 1 will be described with reference to FIG. 7.

At step S10, the opening degree estimating section 61 acquires an acceleration force of the valve element 32 and the driving force 42 applied to the valve element 32 in each valve 31. The detecting section 51 detects the velocity of the valve element 32 and sends the velocity data 302 showing the detected velocity to the opening degree estimating section 61. The opening degree estimating section 61 receives the velocity data 302 and calculates the acceleration force applied to the valve element 32 based on a change of the velocity data 302 received from the detecting section 51. For example, the detecting section 51 detects an angular velocity of the motor that is provided for the actuator 53, and sends the velocity data 302 showing the detected angular velocity to the opening degree estimating section 61. The opening degree estimating section 61 receives the velocity data 302. The opening degree estimating section 61 calculates an angular acceleration of the motor from the change of the received velocity data. That is, the opening degree estimating section 61 calculates an acceleration force applied to the valve element 32 from a product of the calculated angular acceleration and the inertia around the motor axis. The inertia around the motor axis is determined based on the shape of the camshaft 52, the inertia of the motor and so on. The inertia may be calculated in design.

Next, at step S20, the opening degree estimating section 61 estimates the actual opening degree of each valve 31 as an estimated opening degree. The opening degree estimating section 61 subtracts the acceleration force from the driving force 42 calculated at the step S10 to determine a fluid force 41 applied to the valve element 32 by the combustion gas. The opening degree estimating section 61 determines a distance L based on the determined fluid force 41 by using the distance estimation data 45 showing the relation between the distance L and the fluid force 41 as shown in FIG. 4. Because the distance L and the opening degree of the valve 31 have a relation, e.g. a proportional relation, the distance L can be used as the estimated opening degree of the valve 31.

Next, at step S30, the opening degree control section 62 calculates the opening degree difference as a difference between the target opening degree and the actual opening degree of each valve 31. The opening degree control section 62 receives the estimated opening degree from the opening degree estimating section 61. The opening degree control section 62 subtracts the estimated opening degree of each valve 31 calculated at the step S20 from the target opening degree to the valve 31 to calculate the opening degree difference.

Figure 8:
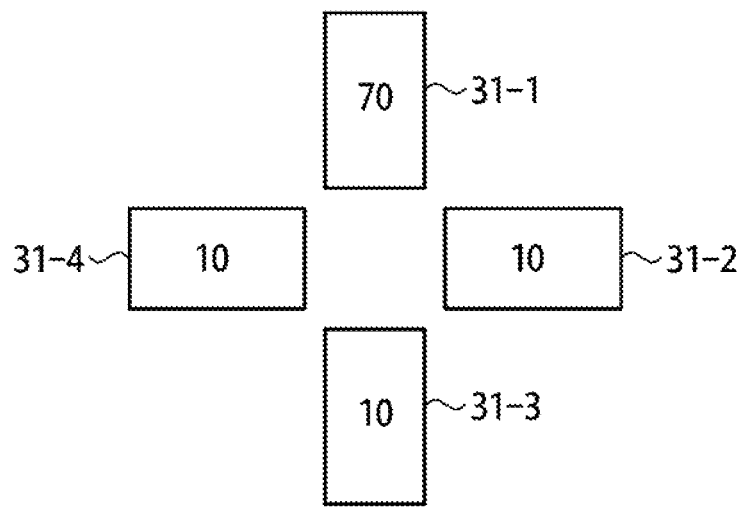
FIG. 8 is a diagram showing a target opening degree set to each of valves in an example of processing of FIG. 7.

Here, the opening degree control section 62 keeps the target opening degrees because instructing the target opening degrees to the driving sections 55. For example, as shown in FIG. 8, it is supposed that the opening degree control section 62 has set the target opening degree of "70" to the valve 31-1, the target opening degree of "10" to the valve 31-2, the target opening degree of "10" to the valve 31-3, and the target opening degree of "10" to the valve 31-4. These target values are equivalent to the target opening degrees to the driving sections. As a result, the driving section 55 to each nozzle 30 sets the opening degrees of the valves 31 according to the target opening degrees. This opening degree may be the distance L.

Figure 9:
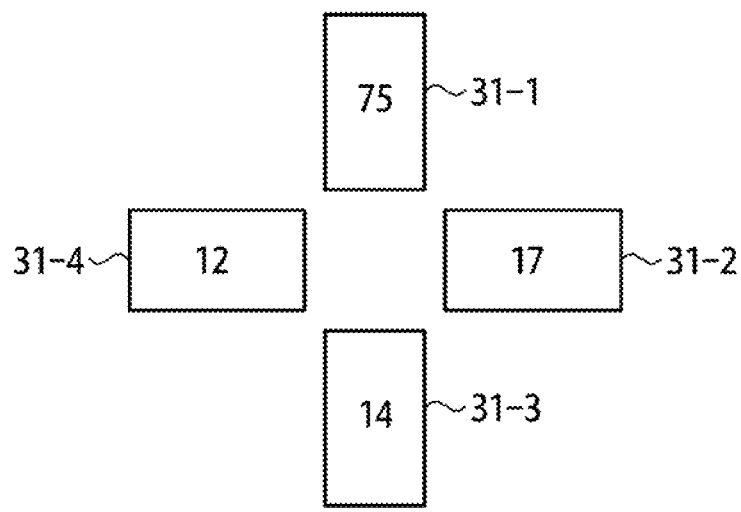
FIG. 9 is a diagram showing an estimated opening degree of each valve in the example of processing of FIG. 7.
Figure 10:
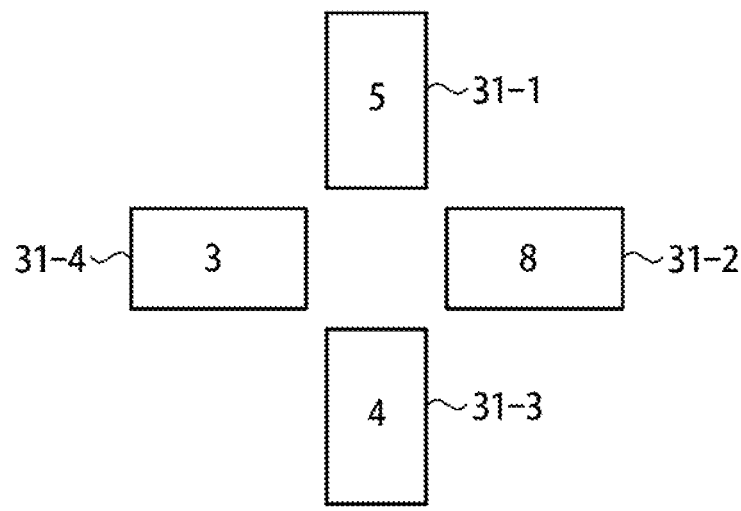
FIG. 10 is a diagram showing an opening degree difference calculated for every valve in the example of processing of FIG. 7.

Next, it is supposed that the opening degree estimating section 61 has estimated through the processing of step S20 that the estimated opening degree of the valve 31-1 is "75", the estimated opening degree of the valve 31-2 is "17", the estimated opening degree of the valve 31-3 is "14", and the estimated opening degree of the valve 31-4 is "12", as shown in FIG. 9. In this case, the opening degree control section 62 subtracts the target opening degrees from the estimated opening degrees to calculate the opening degree differences. As a result, the opening degree differences are "5" for the valve 31-1, "8" for the valve 31-2, "4" for the valve 31-3 and "3" for the valve 31-4, as shown in FIG. 10. In this way, the opening degree control section 62 determines the opening degree differences.

Next, at step S40, the opening degree control section 62 receives the pressure data showing the pressure in the combustion chamber 12. The pressure sensing section 13 senses the pressure in the combustion chamber 12 to output the pressure data 304 containing data showing the sensed pressure. The opening degree control section 62 receives the pressure data 304 to extract the sensed pressure.

Next, at step S50, the opening degree control section 62 subtracts a target pressure from the sensed pressure to calculate a pressure difference. For example, it is supposed that the target pressure is 100 MPa. At this time, it is supposed that the sensed pressure in the combustion chamber 12 is 90 MPa. The pressure difference in this case becomes −10. This value is an example and the calculated pressure difference may be multiplied by a predetermined constant. The constant may be determined in design. Also, by using a simulation, the constant may be set to an optimal value.

Also, the target pressure is a value used by the opening degree control section 62 to set the opening degrees to the valves 31 at present. Also, the target pressure may be a value determined by a device other than the opening degree control section 62 in order to control a trajectory and attitude of the flying object with the thruster, and be supplied to the opening degree control section 62.

Next, at step S60, the opening degree control section 62 calculates the correction opening degree of each valve 31.

Specifically, the opening degree control section 62 calculates a rate of the opening degree difference of each valve 31 to a total of the opening degree differences of all the valves 31. The opening degree control section 62 multiplies the pressure difference by the calculated rate to calculate the correction opening degree of each valve 31. Thus, the opening degree control section 62 adds the calculated correction opening degree to the target opening degree to calculate new target opening degrees to the valves 31. The opening degree control section 62 sends the new target opening degrees as the control data to the driving section 55.

Figure 11:
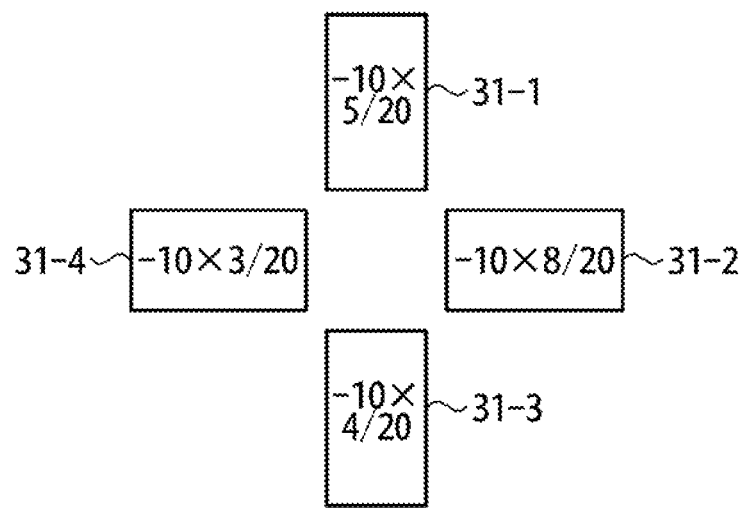
FIG. 11 is a diagram showing a correction opening degree of each valve based on the pressure in a combustion chamber in the example of processing of FIG. 7.

For example, when the opening degree differences are as shown in FIG. 10, the total of the opening degree differences is calculated to be "20". Therefore, the rate of the opening degree difference of the valve 31-1 to the total of the opening degree differences of the valves 31 is "5/20". Similarly, the rate of the opening degree difference of the valve 31-2 is "8/20", the rate of the opening degree difference of the valve 31-3 is "4/20" and the rate of the opening degree difference of the valve 31-4 is "3/20". When each of these rates is multiplied by the pressure difference, as shown in FIG. 11, the correction opening degree of $-10 \times 5/20 = -2.5$ to the valve 31-1, the correction opening degree of $-10 \times 8/20 = -4$ to the valve 31-2, the correction opening degree of $-10 \times 4/20 = -2$ to the valve 31-3 and the correction opening degree of $-10 \times 3/20 = 1.5$ to the valve 31-4 are obtained.

Figure 12:
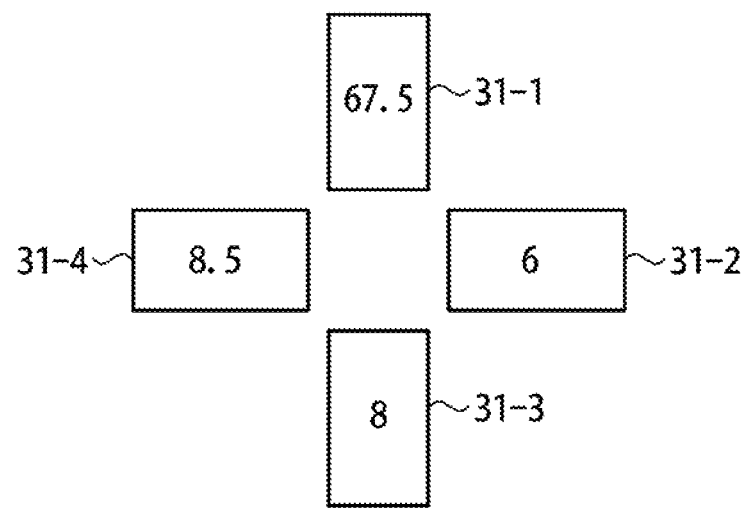
FIG. 12 is a diagram showing a new target opening degree set to each valve in the example of processing of FIG. 7.

In this case, as shown in FIG. 12, the opening degree control section 62 generates the control data 305 to set the new target opening degree of "67.5" to the valve 31-1 as the setting opening degree, the new target opening degree of "6" to the valve 31-2, the new target opening degree of "8" to the valve 31-3, and the new target opening degree of "8.5" to the valve 31-4. In this example, regarding the new target opening degrees, the control data set by the opening degree control section 62 at present has been described. The new target opening degrees may be determined by a device other than the opening degree control section 62 to control the trajectory and attitude of the flying object. In this case, the opening degree control section 62 acquires the target opening degrees from outside.

Next, at step S70, the opening degree control section 62 transmits the control data 305 to the driving sections 55 to set the new target opening degrees in the driving sections 55. Thus, the driving section 55 moves the valve element 32 based on the new target opening degree. As a result, the thruster 1 can be controlled precisely by estimating the opening degree of each valve 31, even when the valve 31 is transformed.

(Performance Evaluation)

Figure 13:
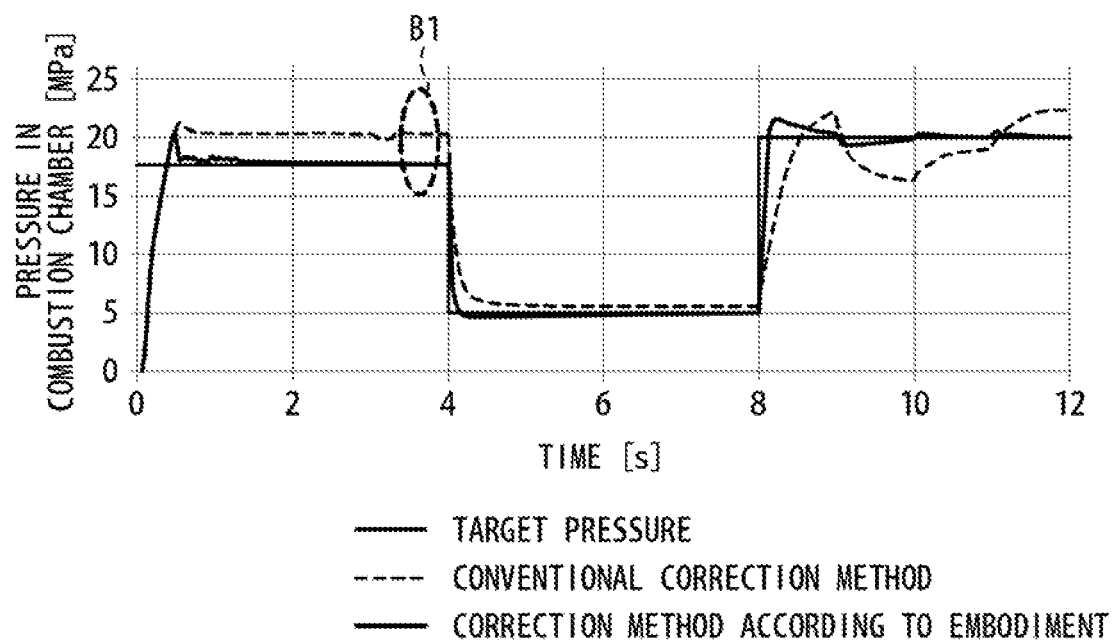
FIG. 13 is a graph showing a result of performance evaluation in the embodiment regarding the pressure in the combustion chamber.
Figure 14:
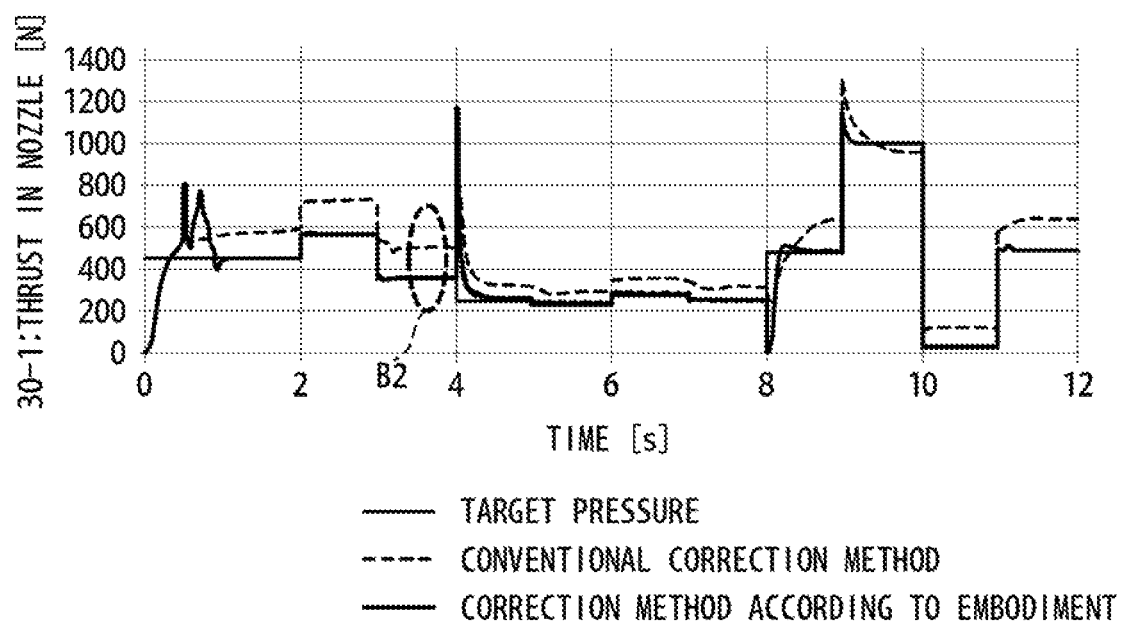
FIG. 14 is a graph showing the result of performance evaluation in the embodiment regarding the thrust of a nozzle.

A performance evaluation is carried out through a simulation of the flying object having four valves 31 by using a conventional correction method and the correction method according to the embodiment. In the conventional correction method, the correction data are acquired by using the simulation result of combustion examination, and the correction is carried out in common to all the valves 31. It was supposed that the opening degree of the valve 31-1 was increased by 10%, the opening degree of the valve 31-2 was increased by 40%, the opening degree of the valve 31-3 was increased by 20% and the opening degree of the valve 31-4 was increased by 30%. Also, as shown in FIG. 13, a target pressure in the combustion chamber 12 is 17 MPa until 4 seconds have elapsed after the simulation is started, 5 MPa until 8 seconds have elapsed after the period of 4 seconds, and 20 MPa until 12 seconds have elapsed after the period of 8 seconds. A target thrust of the nozzle 30-1 having the valve 31-1 is varied in a range from 150 N to 1000 N in units of 1 second, as shown in FIG. 14. The target thrust of the nozzle 30-2 having the valve 31-2 is varied in a range from 50 N to 1000 N in units of 1 second, as shown in FIG. 15.

Referring to FIG. 13, it could be understood that a difference from the target pressure in the combustion chamber 12 is smaller in the correction method according to the embodiment than in the conventional correction method. Especially, in B1 after 3 seconds from the start of the simulation, an error was +15% in the conventional correction method but the error was decreased to +1% in the correction method according to the embodiment.

Referring to FIG. 14, it could be understood that a difference from the target thrust by the nozzle 30-1 is smaller in the correction method of the embodiment than in the conventional correction method. Especially, in B2 after 3 seconds from start of the simulation, the error was +41% in the conventional correction method but the error decreased to −1% in the correction method of the embodiment. Here, although the target thrust after 4 seconds from the start of the simulation was decreased from 350 N to 250 N, the thrust increased in both of the conventional correction method and the correction method of the embodiment. This is because the target pressure in the combustion chamber 12 was decreased from 17 MPa to 5 MPa after 4 seconds from the start of the simulation, so that it was necessary to increase the opening degree of the valve 31-1. When 8 seconds have elapsed after the start of the simulation, the target thrust increased, whereas, the thrust decreased in both of the conventional correction method and the correction method in the embodiment. This is to control the pressure of the combustion chamber 12.

Figure 15:
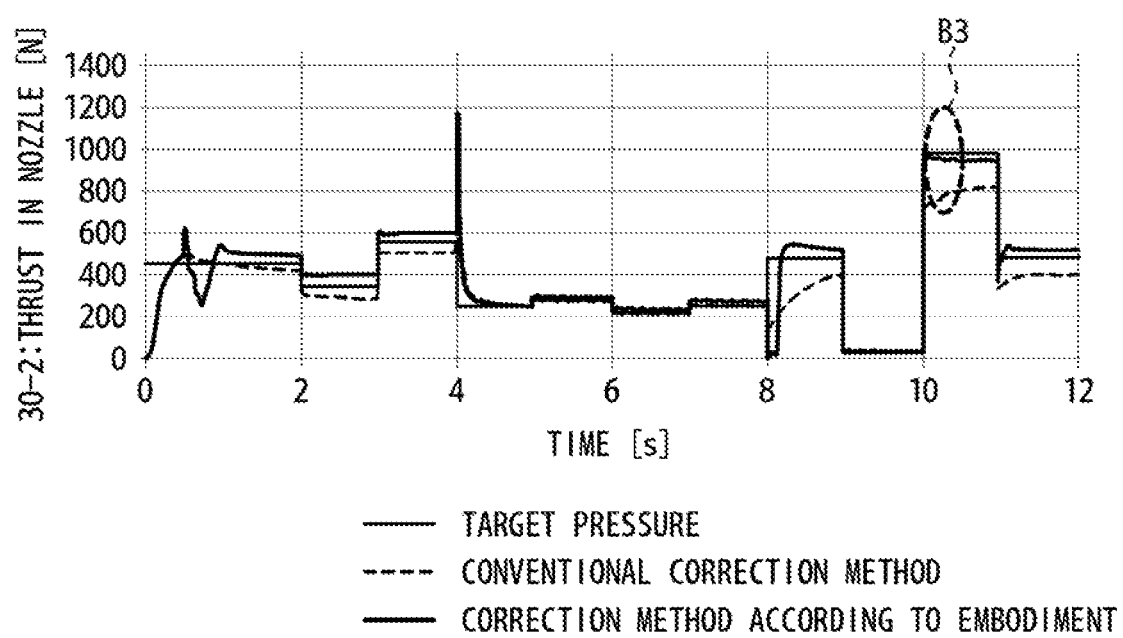
FIG. 15 is a graph showing a result of performance evaluation in the embodiment regarding the thrust of nozzle.

Referring to FIG. 15, it could be understood that a difference from the target thrust of the nozzle 30-2 is smaller in the correction method of the embodiment than in the conventional correction method. Especially, in B3 after 10 seconds from the start of the simulation, the error was −22% in the conventional correction method but the error was decreased to −2% in the correction method of the embodiment. Also, the target thrust decreased after 4 seconds from the start of the simulation, whereas, the error increased in both of the correction methods. This is the same as in case of the nozzle 30-1.

Modification Examples

In the above embodiment, an example has been described in which the detecting section 51 detects the velocity of the valve element 32 and the opening degree estimating section 61 calculates an acceleration force of the valve element 32. However, the present invention is not limited to this example. If the opening degree estimating section 61 can calculate the acceleration force of the valve element 32, an optional method can be selected. For example, the detecting section 51 may detect the acceleration of the valve element 32, and the opening degree estimating section 61 may calculate the acceleration force based on the detected acceleration.

In the above embodiment, an example has been shown in which the driving section 55 rotates the camshaft 52 by the actuator 53 to apply the driving force 42 to the valve element 32. However, the present invention is not limited to this example. The driving section 55 can give the valve element 32 the acting force to move the valve element 32. If the acting force is detected, anyone of the optional methods can be selected. For example, the driving section 55 may have a linear motor and may move the valve element 32 by the driving force of the linear motor.

Figures 16, 17:
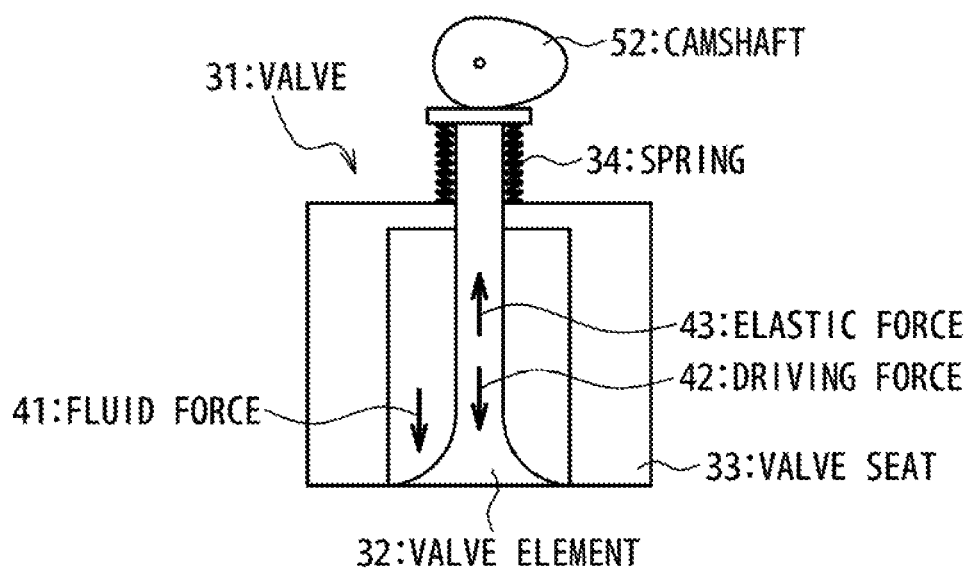
FIG. 16 is a schematic diagram showing a modification example of the valve shown in FIG. 1.
FIG. 17 is a diagram showing estimation data showing a relation between the fluid force and the opening degree.

In the above embodiment, an example has been shown in which the valve 31 is a pintle valve. However, the present invention is not limited to this. The fluid force 41 is applied to the valve element 32 by the combustion gas passing the valve 31. If the opening degree of the valve 31 can be controlled to balance the fluid force 41 and the acting force applied to the valve element 32, an optional valve can be selected. For example, the valve may be a poppet valve, as shown in FIG. 16. In this case, the fluid force 41 and the driving force 42 are applied to a direction to open the valve 31. The elastic force 43 by a spring 34 is applied to a direction opposite to the above direction. In other words, the valve element 32 moves to a position where the resultant force of the fluid force 41 and the driving force 42 balances with the elastic force 43.

In the above embodiment, an example has been shown in which the opening degree of the valve 31 is defined by using the distance L to the end of the valve element 32 from the valve seat 33. However, the present invention is not limited to this. It is sufficient to define the opening degree of the valve 31 by using the position of the valve element 32, and in such a case, one of the optional methods may be selected. For example, a reference point may be set at an optional position of the valve element 32, and the opening degree of the valve 31 may be defined by using the distance between the position of the reference point when the valve 31 is closed and the current position of the reference point. For example, the end of the valve element 32 in the direction opposite to the valve seat 33 may be defined as the reference point.

In the above embodiments, an example has been shown in which the opening degree of the valve 31 is defined by using the position of the valve element 32. However, the present invention is not limited to this. If the opening degree of the valve 31 can be controlled, anyone of parameters can be select optionally.

In the above embodiments, the distance estimation data 45 of FIG. 4 has been shown as an example of data used to estimate the opening degree of the valve 31. However, the data are not limited to this. It is sufficient to estimate the opening degree of the valve 31 from the fluid force 41, and any data can be used optionally. For example, estimation data 46 may be used in which the fluid force 41 and the opening degree of the valve 31 corresponding to the fluid force 41 are stored, as shown in FIG. 17. In this case, the opening degree of the valve 31 that is nearest to the calculated fluid force 41 is read from the estimation data 46.

In the above embodiment, at step S50, an example has been shown in which the correction opening degree of each valve 31 is calculated by multiplying the rate of the opening degree difference by the pressure difference. However, a predetermined constant may be multiplied. The constant may be determined in design. Also, by using the simulation, an optimal constant may be calculated.

In the above embodiment, an example has been described in which the opening degree of the valve 31 is corrected based on the pressure sensed by the pressure sensing section 13. However, this processing may be omitted. In such a case, in the processing shown in FIG. 7, step S40 and step S50 may be omitted. Also, data having a sign opposite to a sign of the calculated opening degree difference shown in FIG. 10 or data obtained by multiplying the opening degree difference by the predetermined constant may be used for the correction of the opening degree of each valve 31. The predetermined constant is determined in design. Also, by using the simulation, an optimal value may be determined.

The processing described above is an example and the order of the steps and the processing content of each of the steps may be change or modified in a range without changing the gist. Also, the described configuration may be changed or modified optionally in the range without changing the gist.

The present invention is based on Japanese Patent Application No. JP 2018-031105 as a basis application and claims a priority based on it. The disclosure of the basis application is incorporated herein by reference.

What is claimed is:

1. A thruster control device comprising:
   an opening degree estimating section configured to calculate an estimated opening degree of a valve showing a rate at which the valve is opened, based on a balance of an acting force applied to a valve element of the valve to adjust a quantity of combustion gas to be ejected from a thruster and a fluid force applied to the valve element by an ejected combustion gas; and
   an opening degree control section configured to determine a target opening degree based on the estimated opening degree to control an opening degree of the valve,
   wherein the opening degree estimating section calculates the fluid force based on an acceleration of the valve element and the acting force, and calculates the estimated opening degree based on the fluid force.

2. The thruster control device according claim 1, wherein the opening degree estimating section is configured to hold opening degree data showing the opening degree of the valve to the fluid force applied to the valve element by the ejected combustion gas, calculate an acceleration force giving the valve the acceleration based on the acceleration, calculate the fluid force by subtracting the acceleration force from the acting force, and calculate the estimated opening degree from the fluid force based on the opening degree data.

3. The thruster control device according to claim 1, further comprising a valve element control section,
   wherein the valve element control section comprises:
   a driving section configured to apply the acting force to the valve element to control the opening and closing of the valve; and
   a detecting section configured to detect a velocity of the valve element,
   wherein the opening degree estimating section is configured to calculate the acceleration based on the velocity, and
   wherein the driving section is configured to control the opening and closing of the valve based on the target opening degree.

4. The thruster control device according to claim 3, further comprising a plurality of the valve element control sections,
   wherein the opening degree estimating section is configured to calculate the estimated opening degree for each of the plurality of valve element control sections, and
   wherein the opening degree control section is configured to determine the target opening degree for each of the plurality of valve element control sections.

5. The thruster control device according to claim 4, further comprising:
   a combustion chamber configured to store the combustion gas to be ejected from the thruster; and
   a pressure sensing section configured to sense a pressure in the combustion chamber,
   wherein the opening degree control section is configured to determine the target opening degree for each of the plurality of valve element control sections based on the sensed pressure by the pressure sensing section and the estimated opening degree for each valve element control section.

6. The thruster control device according to claim 5, wherein the opening degree control section is configured to hold a previous target opening degree of the valve set by the acting force of the driving section of each valve element control section, subtract a target pressure from pressure by the pressure sensing section to calculate a pressure difference, subtract the previous target opening degree from the estimated opening degree to calculate an opening degree difference for each valve element control section, and determine the target opening degree for each valve element control section based on the pressure difference and a rate of the opening degree difference of each valve element control section for a total of the opening degree differences of the plurality of valve element control sections.

7. The thruster control device according to claim 6, wherein the opening degree control section is configured to calculate the target opening degree based on a product of the pressure difference and the rate of the opening degree difference of each valve element control section to the total of opening degree differences and the previous target opening degree.

8. The thruster control device according to claim 3, wherein the driving section has a motor configured to generate the acting force by a current, and wherein the opening degree estimating section is configured to calculate the acting force based on a value of the current.

9. The thruster control device according to claim 1, wherein the estimated opening degree is defined based on an estimated position of the valve element, and wherein the target opening degree is defined based on a destination position of the valve element.

10. A thruster control method comprising:
calculating an estimated opening degree of a valve showing a rate at which the valve is opened, based on a balance of an acting force to applied to a valve element of the valve to adjust a quantity of combustion gas to be ejected from a thruster and a fluid force applied to the valve element by an ejected combustion gas; and
determining a target opening degree based on the estimated opening degree to control an opening degree of the valve,
wherein the calculating the estimated opening degree of the valve comprises:
calculating the fluid force based on an acceleration of the valve element and the acting force; and
calculating the estimated opening degree based on the fluid force.

* * * * *